(12) United States Patent
Shin

(10) Patent No.: US 9,347,347 B2
(45) Date of Patent: May 24, 2016

(54) EXHAUST GAS AFTER-TREATMENT DEVICE FOR DIESEL ENGINE

(75) Inventor: Yong Shin, Changnyeong-gun (KR)

(73) Assignee: DAEDONG INDUSTRIAL CO., LTD., Daegu (KR)

( * ) Notice: Subject to any disclaimer, the term of this patent is extended or adjusted under 35 U.S.C. 154(b) by 50 days.

(21) Appl. No.: 13/978,928

(22) PCT Filed: Jan. 11, 2012

(86) PCT No.: PCT/KR2012/000270
§ 371 (c)(1),
(2), (4) Date: Jul. 10, 2013

(87) PCT Pub. No.: WO2012/096510
PCT Pub. Date: Jul. 19, 2012

(65) Prior Publication Data
US 2013/0291524 A1 Nov. 7, 2013

(30) Foreign Application Priority Data
Jan. 11, 2011 (KR) .................. 10-2011-0002685

(51) Int. Cl.
*F01N 3/00* (2006.01)
*F16L 55/00* (2006.01)
*F01N 3/28* (2006.01)
*B01D 53/94* (2006.01)
*F01N 3/035* (2006.01)
*F01N 3/10* (2006.01)
*F01N 13/00* (2010.01)
*F01N 3/021* (2006.01)

(52) U.S. Cl.
CPC ............... *F01N 3/00* (2013.01); *F01N 3/2892* (2013.01); *B01D 53/944* (2013.01); *B01D 53/9477* (2013.01); *B01D 2258/012* (2013.01); *F01N 3/021* (2013.01); *F01N 3/035* (2013.01); *F01N 3/103* (2013.01); *F01N 13/0097* (2014.06); *F01N 2240/20* (2013.01); *F01N 2250/02* (2013.01);
(Continued)

(58) Field of Classification Search
CPC ... F01N 3/103; F01N 3/0231; F01N 13/0097; F01N 13/141; F01N 3/2821; F01N 2470/18
USPC .......... 60/297, 286, 295, 324; 138/37, 42, 43, 138/45, 46
See application file for complete search history.

(56) References Cited

U.S. PATENT DOCUMENTS 3,729,937 A * 5/1973 Haddad ........................... 60/298
2003/0159414 A1 8/2003 Cheng et al.
(Continued)

FOREIGN PATENT DOCUMENTS

JP 3867096 B1 1/2007
KR 20-0433965 Y1 12/2006
(Continued)

OTHER PUBLICATIONS

KIPO Office Action for Korean Patent Application No. 10-2011-0002685.

*Primary Examiner* — Audrey K Bradley
*Assistant Examiner* — Anthony Ayala Delgado
(74) *Attorney, Agent, or Firm* — LRK Patent Law Firm

(57) ABSTRACT

An exhaust gas after-treatment device for a diesel engine is provided. The exhaust gas after-treatment device comprises an oxidation treatment unit having a diesel oxidation catalyst (DOC), an adsorption treatment unit having a diesel particulate filter (DPF), and a discharge unit for discharging exhaust gas that is filtration-treated through the oxidation treatment unit and the adsorption treatment unit, wherein the DOC of the oxidation treatment unit is provided with a baffle on the front thereof for even diffusion-introduction of exhaust gas.

4 Claims, 8 Drawing Sheets

(52) U.S. Cl.
CPC ......... *F01N 2470/18* (2013.01); *F01N 2530/04* (2013.01)

(56) References Cited

U.S. PATENT DOCUMENTS

2008/0216470 A1 9/2008 Sedlacek et al.
2009/0272106 A1* 11/2009 Werni et al. ............... 60/297
2011/0023471 A1* 2/2011 Werni et al. ............... 60/297

FOREIGN PATENT DOCUMENTS

| | | | |
|---|---|---|---|
| KR | 10-0675957 | B1 | 2/2007 |
| KR | 10-2007-0050687 | A | 5/2007 |
| KR | 10-2008-0011325 | A | 2/2008 |
| KR | 10-2009-0064159 | A | 6/2009 |
| KR | 10-0922513 | B1 | 10/2009 |

* cited by examiner

EXHAUST GAS AFTER-TREATMENT DEVICE FOR DIESEL ENGINE

TECHNICAL FIELD

The present invention relates to an exhaust gas after-treatment device and, more particularly, to a diesel engine exhaust gas after-treatment device, which is configured to reduce environmental contamination due to exhaust gas by oxidation and adsorption treatment of harmful ingredients contained in diesel engine exhaust gas.

BACKGROUND ART

As an after-treatment device for a diesel engine, which is configured to minimize contaminants and preserve atmospheric environment, a catalyzed particulate filter including a diesel oxidation catalyst (hereinafter referred to as "DOC") and a diesel particulate filter (hereinafter referred to as "DPF") is widely used in the art.

The purification of diesel engine exhaust gas is mainly aimed at reducing nitrogen oxides (NOx) and particulate materials (PM, various harmful particulate materials including exhaust gas), and these materials are adsorbed on the DOC or by the DPF during the exhaust process. When the nitrogen oxides and particulate materials are continuously accumulated, the processing performance of the device is reduced, and thus periodic regeneration is required.

In the exhaust gas after-treatment device, the regeneration is mainly achieved by increasing the engine RP to increase the exhaust gas temperature or operating a separate regeneration device to heat and burn the particulate materials adsorbed/collected in the device to be removed, and the regeneration time is determined depending on the amount of collected particulates detected by a differential pressure sensor or depending on a predetermined cycle stored in an ECU when the amount of adsorbed/collected particulates increases or when the predetermined cycle has elapsed.

In order to achieve more effective purification treatment in the above-described exhaust gas after-treatment device and to achieve more effective regeneration in reprocessing of the particulate materials collected by the DPF, it is important for the exhaust gas introduced into the exhaust gas after-treatment device to have flow characteristics with uniform distribution over the entire area of the DOC.

However, in the case of a typical exhaust gas after-treatment device mounted in a conventional agricultural vehicle, the flow of exhaust gas is generally not uniform over the entire area of the DOC and is concentrated in a local area. As a result, the catalysis efficiency of the DOC is reduced, and the particulate materials are locally accumulated in the DPF, which are problematic.

Furthermore, when the particulate materials are locally accumulated in the DPF due to the non-uniform flow of exhaust gas, heat exceeding a heat resistance limit of the DPF is instantaneously generated as the locally accumulated particulate materials are burned during the regeneration of the DPF, which makes the DPF unusable, and thus the DPF should be replaced with a new one.

DISCLOSURE

Technical Problem

Accordingly, the present invention has been made to solve the above-described problems, and an object of the Present invention is to provide a diesel engine exhaust gas after-treatment device in which a baffle with perforations is provided in front of a DOC such that exhaust gas can be introduced into the DOC with a uniform flow distribution over the entire area of the DOC.

Technical Solution

To accomplish the above objects of the present invention, according to an aspect of the present invention there is provided a diesel engine exhaust gas after-treatment device comprising: an oxidation treatment unit which includes a diesel oxidation catalyst (DOC) and a hollow DOC cover having an internal space into which the DOC is inserted; an adsorption treatment unit which is disposed at the rear of the oxidation treatment unit and includes a diesel particulate filter (DPF) and a hollow DPF cover having an internal space into which the DPF is inserted; a discharge unit which is disposed at the rear of the adsorption treatment unit and includes a hollow outlet cover with an outlet through which exhaust gas, which is purified while passing through the oxidation treatment unit and the adsorption treatment unit, is discharged, and an end plate which covers one side of the outlet cover; and a baffle which is disposed in front of the DOC of the oxidation treatment unit to facilitate the uniform distribution of the exhaust gas, wherein the baffle includes a perforated surface on which a plurality of perforations are formed, and the perforations formed on the perforated surface are formed at different densities.

In an embodiment, the baffle may be made of metal, preferably stainless steel, and the center of the perforated surface, on which the plurality of perforations are formed, may preferably be concavely curved at a constant curvature toward the front through which the exhaust gas is introduced.

Moreover, in this embodiment, the perforated surface on which the perforations are formed at different densities may preferably be divided into a high-density perforated area in which the perforations are distributed in a regular arrangement and a low-density perforated area in which the perforations are distributed at a lower density than the high-density perforated area.

In this case, the low-density perforated area may preferably be divided into a perforated portion, in which the perforations are formed in an arc arrangement along the edge of the perforated surface, and a non-perforated portion which is provided outside the perforated portion and has no perforations.

The low-density perforated area may preferably be formed in a predetermined area at a position spaced a predetermined distance in parallel from cross-axis line C1 of the baffle.

In detail, the low-density perforated area may be an area defined as a bow shape from a point spaced ½ of the radius of the baffle from the cross-axis line C1 to a point spaced ⅘ of the radius of the baffle from the cross-axis line C1.

Advantageous Effects

According to an exhaust gas after-treatment device in accordance with an embodiment of the present invention including a DOC and a DPF, a baffle with perforations is provided in front of the DOC, and thus exhaust has can be introduced into the DOC with a uniform flow distribution over the entire area of the DOC.

When the exhaust gas is uniformly introduced into the DOC with a uniform flow distribution over the entire area of the DOC, the catalysis efficiency of the DOC can be improved during the treatment of exhaust gas, and the particulate materials (PM) can be uniformly adsorbed on the entire area of the DPF, thus improving the processing performance of the entire exhaust gas after-treatment device.

Moreover, when the particulate materials are uniformly accumulated in the DPF in the above manner, the regeneration it of the DPF is also required, but the problem that high temperature heat is locally generated as the particulate materials are burned can be solved. As a result, it is possible to prevent the problem that the DPF is locally melted during the regeneration process, thus improving the durability of the device.

DESCRIPTION OF REFERENCE NUMERALS

Figure 1:
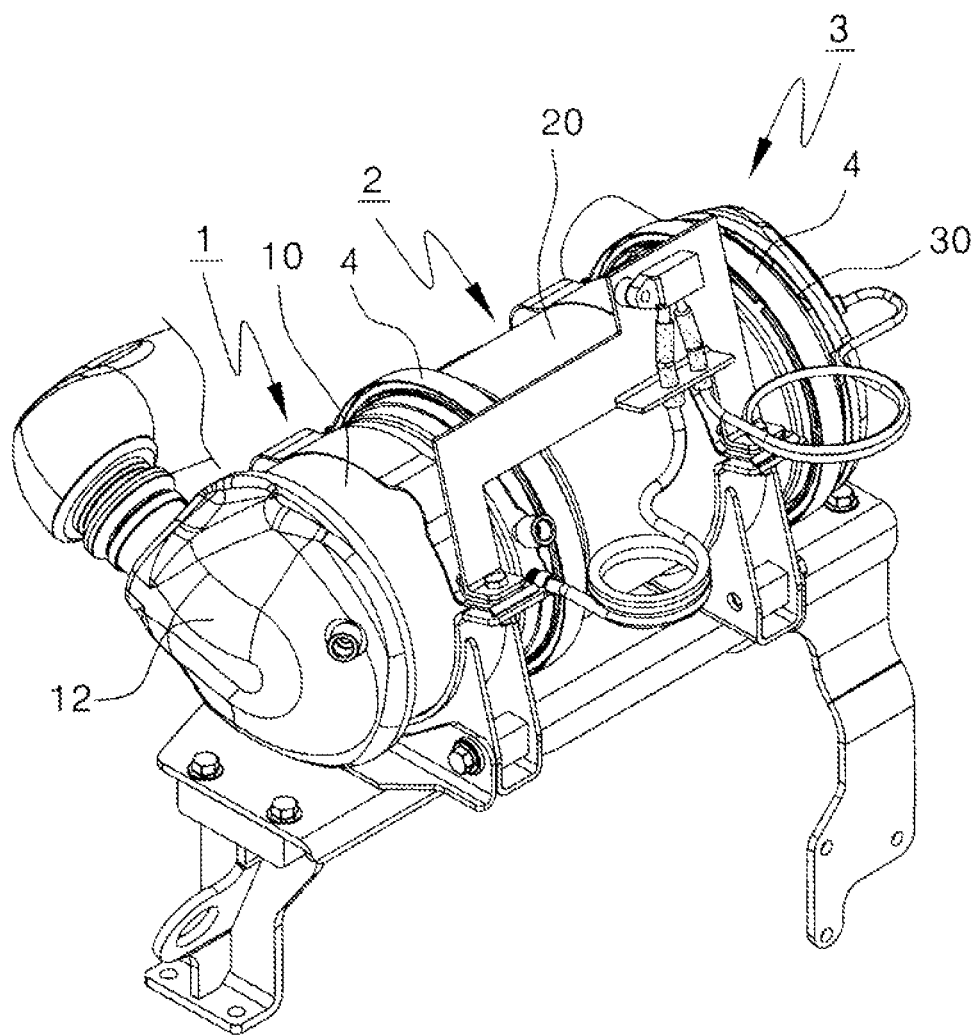
FIG. 1 is a perspective view showing the appearance of a diesel engine exhaust gas after-treatment device in accordance with an embodiment of the present invention.

1: oxidation treatment unit
2: adsorption treatment unit
3: discharge unit
4: V-clamp
7: baffle
10: DOC cover
12, 32: end plate
14: diesel oxidation catalyst (DOC)
20: DPF cover
24: diesel particulate filter (DPF)
30: outlet cover
70: perforated surface
72: perforations
70a: high-density perforated area
70b: low-density perforated area

MODE FOR INVENTION

Hereinafter, preferred embodiments of the present invention will be described in detail with reference to the accompanying drawings.

Figure 2:
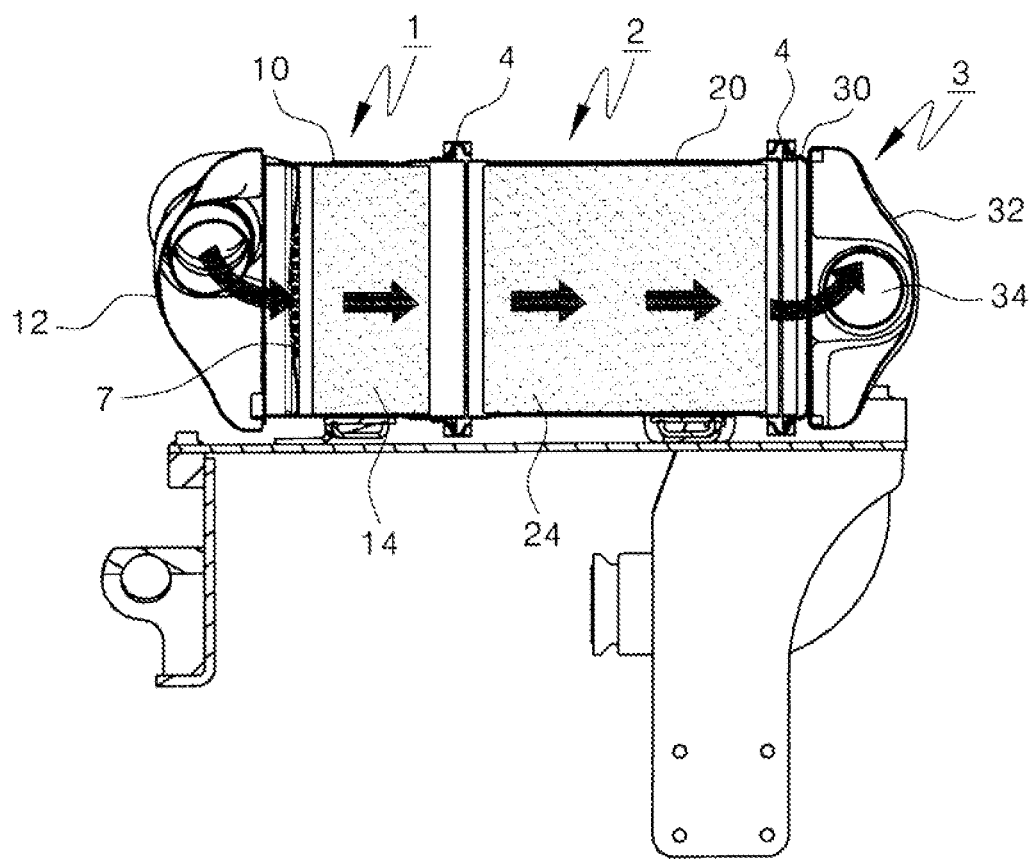
FIG. 2 is a cross-sectional view showing the internal configuration of the diesel engine exhaust gas after-treatment device in accordance with the embodiment of the present invention.
Figure 3:
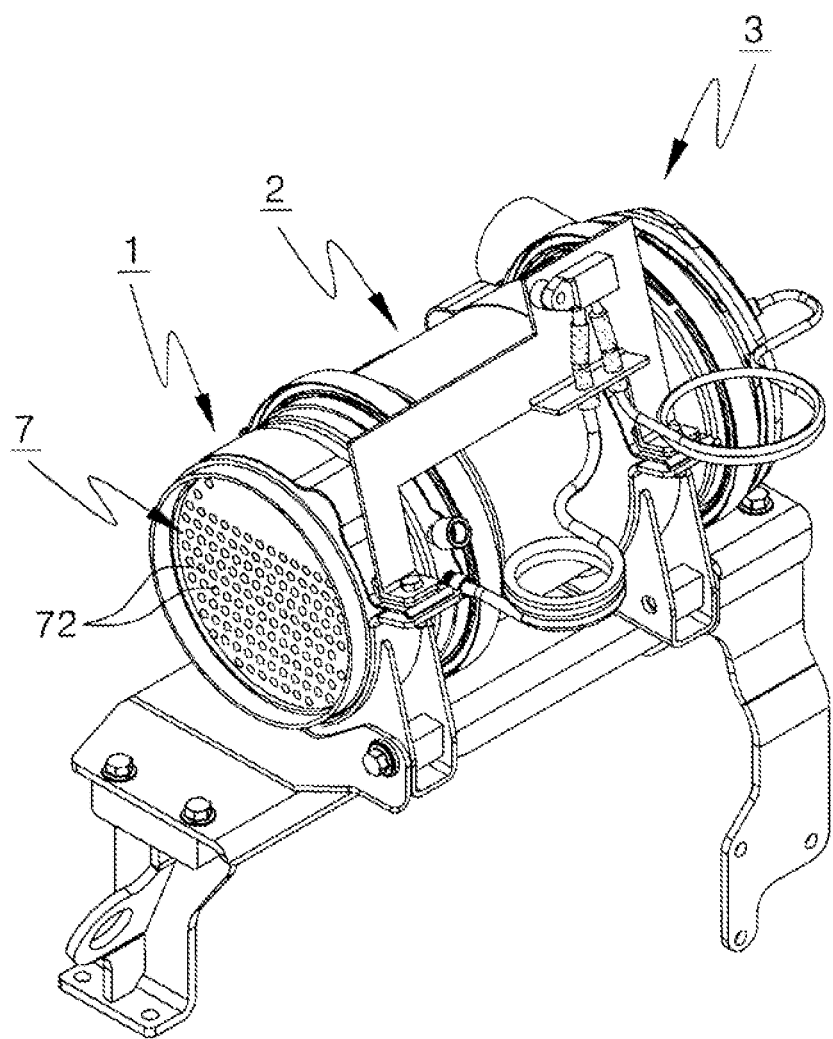
FIG. 3 is a perspective view of a diesel, engine exhaust gas after-treatment device from which some components are removed to show the configuration of main components of the present invention.

FIG. 1 is a perspective view showing the appearance of a diesel engine exhaust gas after-treatment device in accordance, with an embodiment of the present invention, FIG. 2 is a cross-sectional view showing the internal configuration of the diesel engine exhaust gas after-treatment device in accordance with the embodiment of the present invention, and FIG. 3 is a perspective view of a diesel engine exhaust gas after-treatment device from which some components are removed to show the configuration of main components of the present invention.

Referring to FIGS. 1 to 3, a diesel engine exhaust gas after-treatment device in accordance with an embodiment of the present invention (hereinafter referred to simply as "after-treatment device") comprises art oxidation treatment unit 1 which performs an oxidation treatment on oxides contained in the introduced exhaust gas as a first step, an adsorption treatment unit 2 which performs an adsorption treatment on various harmful particulate materials including exhaust gas as a second step, and a discharge unit 3 which is located at the rear of the adsorption unit 2.

The oxidation treatment unit 1 comprises a diesel oxidation catalyst (DOC) 14 (see FIG. 4) which contains a honeycomb type catalyst having a high surface area to create an active chemical reaction. The DOC 14 removes carbon monoxide (CO) and hydrocarbon (HC) and oxidizes nitrogen oxide (NO) in the exhaust gas to be converted to nitrogen dioxide ($NO_2$).

The DOC 14 which constitutes the oxidation treatment unit 1 is protected by a hollow heat insulating cover 10 (hereinafter referred to as "DOC cover"), and an end plate 12 is mounted on one open end of the DOC cover 10 to seal the inside of the DOC 14.

The adsorption treatment unit 2 disposed at the rear of the oxidation treatment unit 1 has a structure, in which a diesel particulate filter (DPF) 24 is provided in a heat insulating cover 20 (hereinafter referred to as "DPF cover") which forms the appearance of the device, and serves to filter particulate materials (PM, various harmful particulate materials including exhaust gas) contained in the exhaust gas.

The nitrogen dioxide ($NO_2$) produced during the oxidation treatment as the first step while passing through the oxidation treatment unit 1 reacts with the particulate materials (PM) collected in the DPF 24 to produce nitrogen oxide (NO) and carbon dioxide ($CO_2$), and the purification of the DPF 24 is achieved by this chemical process.

The discharge unit 3 is disposed at the rear of the adsorption treatment unit 2 and connected to a pipe (not shown) which forms a path for discharging the exhaust gas from which the harmful materials are removed by the purification treatment. The discharge unit 3 has a structure, in which an end plate 32 covers a hollow outlet cover 30 to create a sealed space therein, and includes an outlet 34 connected to the pipe.

The oxidation treatment unit 1, the adsorption treatment unit 2, and the discharge unit 3 are disposed sequentially in series in a direction that the exhaust gas moves, thus forming a single after-treatment device in accordance with the present embodiment. To implement such a single after-treatment device, the DCO cover 10 and the DPF cover 20 as well as the DPF cover 20 and the outlet cover 30 are respectively interconnected by means of a V-clamp 4.

In FIGS. 2 and 3, reference numeral 7 denotes a baffle as a key component of the present invention which uniformly distributes the flow of exhaust gas such that the exhaust gas introduced into the device is uniformly distributed over the entire area of the DOC 14. As such, the baffle 7 is provided in the exhaust gas after-treatment device in accordance with the embodiment of the present invention to uniformly distribute the exhaust gas introduced into the device.

The baffle 7 is disposed in front of the DOC 14 which constitutes the oxidation treatment unit 1 and includes a perforated surface 70 on which a plurality of perforations 72 are formed such that the exhaust gas passes therethrough. In this embodiment, the perforations 72 are formed at different densities for each area such that the exhaust gas is more uniformly distributed toward the DOC 14 based on the flow characteristics of the exhaust gas introduced from the front of the DOC 14. The density of the perforations 72 will be described with reference to FIG. 5 later.

Figure 4:
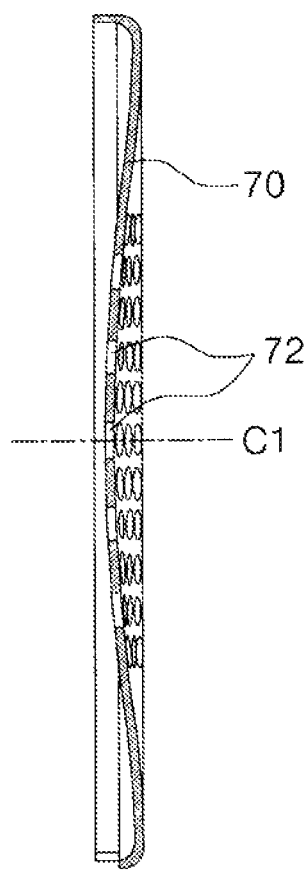
FIG. 4 is a side cross-sectional view of a baffle shown in FIG. 3.
Figure 5:
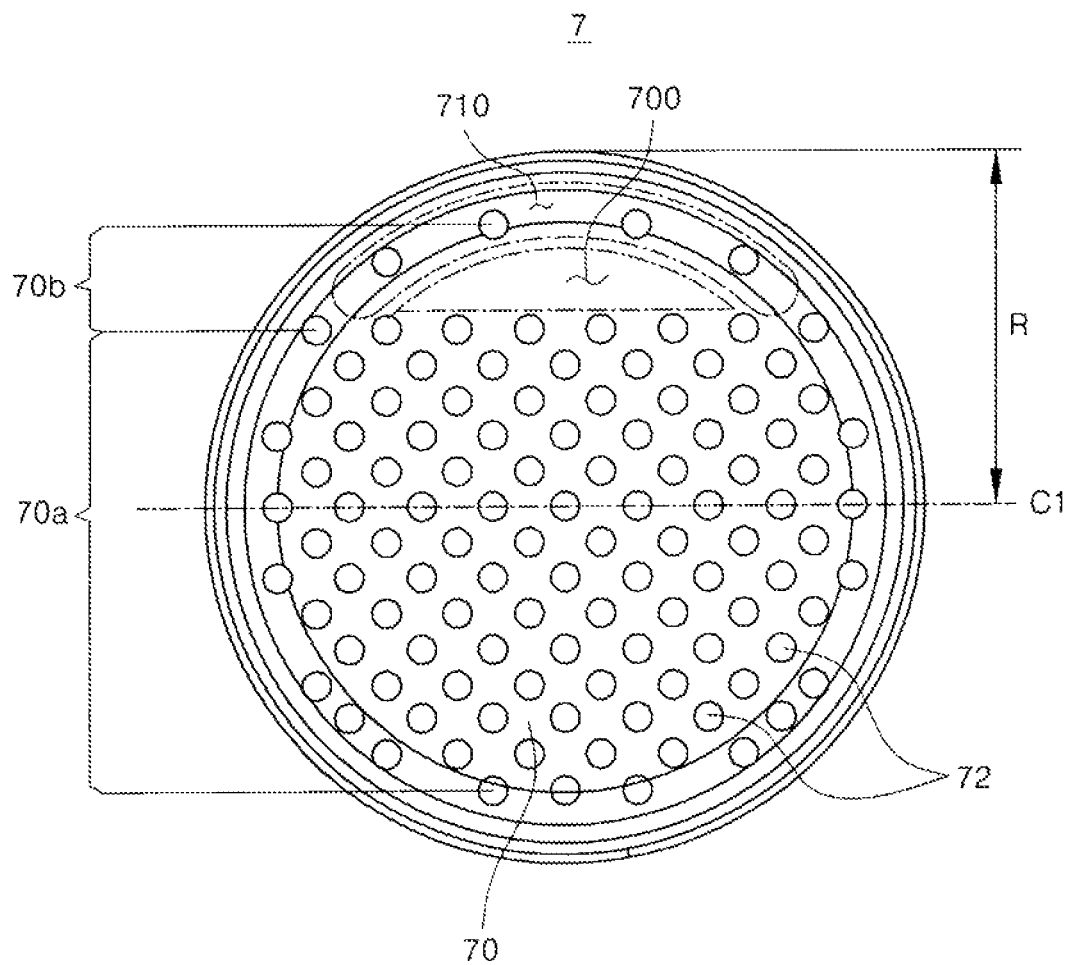
FIG. 5 is a front view of the baffle shown in FIG. 4.

FIG. 4 is a side cross-sectional view of a baffle employed in the present embodiment, and FIG. 5 is a front view of the baffle shown in FIG. 4.

Referring to FIGS. 4 and 5, the baffle 7 is made of a metal material having excellent heat resistance, preferably a stainless steel material, and is not particularly limited to the material. The center of the perforated surface 70, on which the plurality of perforations 72 are formed, is concavely curved at a constant curvature toward the front through which the exhaust gas is introduced (see FIG. 4), and thus the exhaust gas can be introduced through the perforations 72 with a smooth streamline flow, even when the exhaust gas collides with the perforated surface 70.

In this embodiment, the perforations 72 provided on the perforated surface 70 are formed at different densities for each area based on the flow characteristics of the exhaust gas introduced from the front of the DOC 14. Depending on the density of the perforations 72, preferably as shown in FIG. 5, the perforated surface 70 may be divided into a high-density perforated area 70a in which the perforations 72 are distributed in a regular arrangement and a low-density perforated area 70b in which the perforations 72 are distributed at a lower density than the high-density perforated area 70a.

The low-density perforated area 70b may be formed in predetermined area on the perforated surface 70 at a position spaced a predetermined distance in parallel from cross-axis line C1. Such a low-density perforated area 70b may be divided into a perforated portion 700 in which the perforations are formed in an arc arrangement along the edge of the perforated surface 70 and a non-perforated portion 710 which is provided outside the perforated portion 700 and has no perforations.

In detail, the low-density perforated area 70b may be an area defined as a bow shape from a point spaced ½ of the radius (R) of the baffle 7 from the cross-axis line C1 to a point spaced ⅘ of the radius (R) of the baffle 7 from the cross-axis line C1. The reason for the specific numerical limitations on the formation of the low-density perforated area 70b will be apparent from the comparison results of exhaust gas flow simulation which will be described below.

Figure 6:
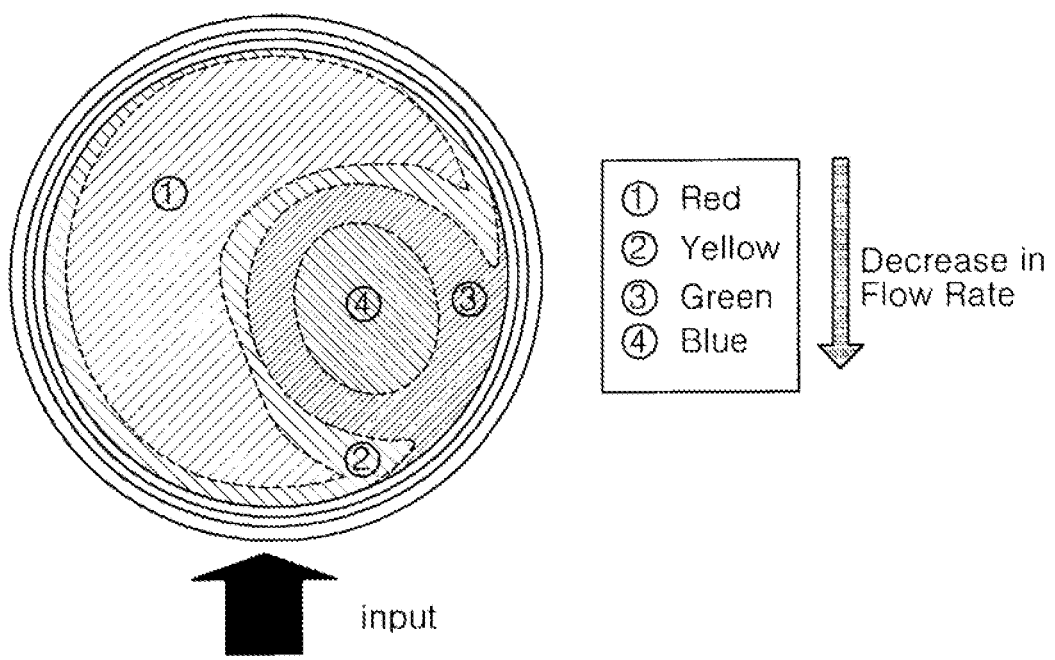
FIG. 6 is a diagram showing the measurement results of flow rate distribution of exhaust gas in a conventional DOC with no baffle.
Figure 7:
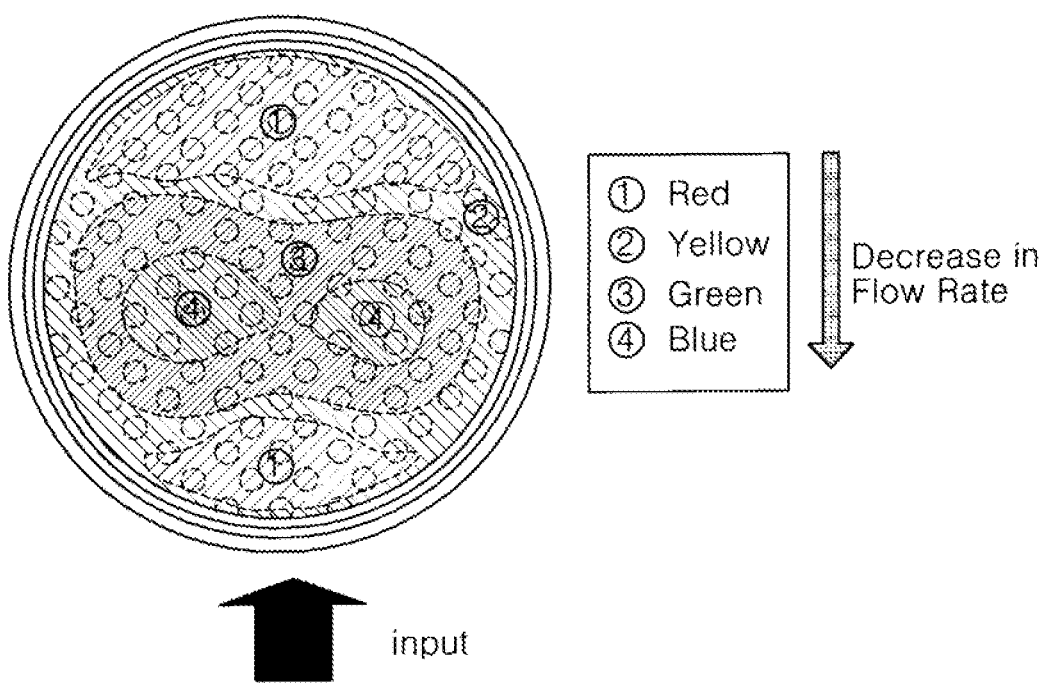
FIG. 7 is a diagram showing the measurement results of flow rate distribution of exhaust gas in a DOC with a baffle in which perforations are formed at a uniform density over the entire perforated surface.
Figure 8:
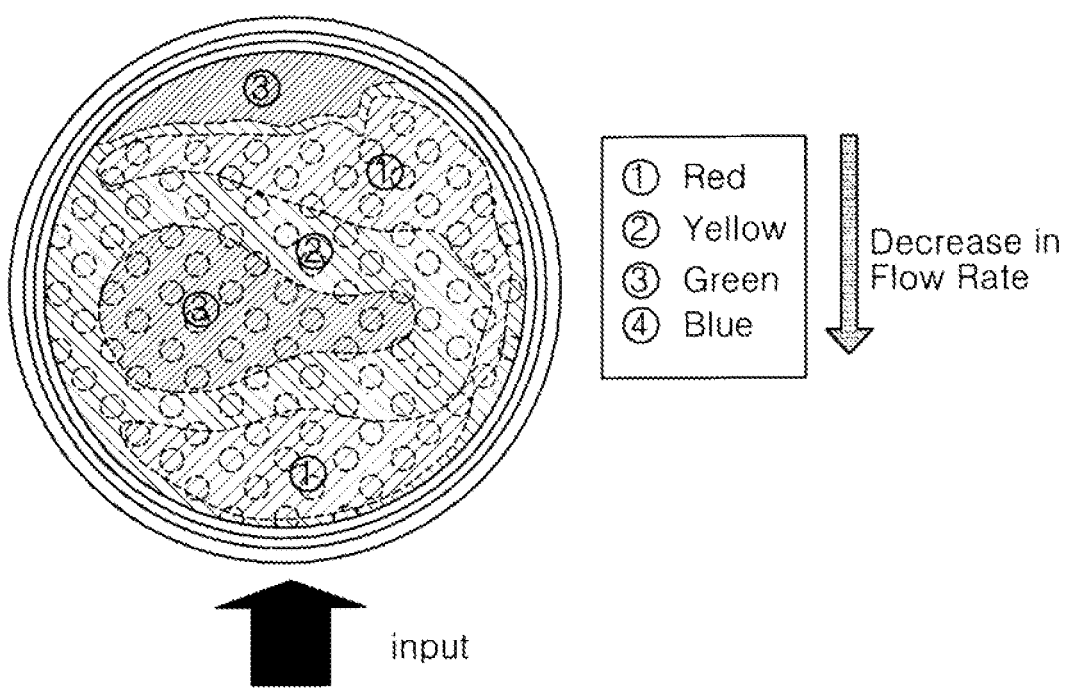
FIG. 8 is a diagram showing the measurement results of flow rate distribution of exhaust gas in a DOC of an exhaust gas after-treatment device in accordance with an embodiment of the present invention.

FIGS. 6 to 8 are diagrams showing the measurement results of flow rate distribution of exhaust gas in devices. FIG. 6 shows the flow rate distribution of exhaust gas in a conventional DOC with no baffle, FIG. 7 shows the flow rate distribution of exhaust gas in a DOC with a baffle in which perforations are formed at a uniform density over the entire perforated surface, and FIG. 8 shows the flow rate distribution of exhaust gas in a DOC with the baffle 7 in which the perforations 72 are formed at different densities for each area based on the above-mentioned numbers.

In the drawings, the parts shown in red have the highest flow rate, and the parts shown in blue have lower flow rates. Referring to the color distribution of the drawings, the lower red and blue areas indicate that the exhaust gas is more uniformly distributed.

Referring to the results of the flow rate measurement based on this, it can be seen that the area shown in red is very widely distributed in FIG. 6 where no baffle is provided and that the areas shown in red and blue are significantly reduced in FIG. 7, in which the baffle with the perforations at a uniform density is employed, compared to FIG. 6.

However, referring to FIG. 8 where the baffle 7 in which the perforations 72 are formed at different densities for each area based on the above-mentioned numbers is employed, it can be seen that the exhaust gas flows with a more uniform flow rate distribution over the entire area of the DOC, compared to FIG. 7 where the baffle in which the perforations 72 are formed at a uniform density is employed. The following table 1 shows the results of the flow rate distribution shown in FIGS. 6 to 8 and calculated as flow uniformity indexes by quantitative analysis

TABLE 1

| Model | Uniformity index |
| --- | --- |
| With no baffle (FIG. 6) | 0.87 |
| With baffle having perforations at uniform density (FIG. 7) | 0.89 |
| With baffle having perforations at different densities (FIG. 8) | 0.91 |

As shown in Table 1, it can be seen that the uniformity index is increased in the case where the baffle in which the perforations are formed at different densities for each area is used as in this embodiment, compared to the conventional case where no baffle is provided (FIG. 6) and the case where the baffle in which the perforations are formed at a uniform density is employed (FIG. 7). This can be interpreted as a result of reducing the density of the perforations in an upstream area based on the flow characteristics of the exhaust gas introduced into the device that flows toward the upstream in the device.

INDUSTRIAL APPLICABILITY

As described above, According to the exhaust gas after-treatment device in accordance with the embodiment of the present invention including the DOC and the DPF, the baffle with the perforations is provided in front of the DOC, and thus the exhaust gas can be introduced into the DOC with a uniform flow distribution over the entire area of the DOC.

When the exhaust gas is uniformly introduced into the DOC with a uniform flow distribution over the entire area of the DOC, the catalysis efficiency of the DOC can be improved during the treatment of exhaust gas, and the particulate materials (PM) can be uniformly adsorbed on the entire area of the DPF, thus improving the processing performance of the entire exhaust gas after-treatment device.

Moreover, when the particulate materials are uniformly accumulated in the DPF in the above manner, the regeneration of the DPF is also required, but the problem that high temperature heat is locally generated as the particulate materials are burned can be solved. As a result, it is possible to prevent the problem that the DPF is locally melted during the regeneration process, thus improving the durability of the device.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A diesel engine exhaust gas after-treatment device comprising:
an oxidation treatment unit which includes a diesel oxidation catalyst (DOC) and a hollow DOC cover having an internal space into which the DOC is inserted;

an adsorption treatment unit which is disposed at the rear of the oxidation treatment unit and includes a diesel particulate fitter (DPF) and a hollow DPF cover having an internal space into which the DPF is inserted;

a discharge unit which is disposed at the rear of the adsorption treatment unit and includes a hollow outlet cover with an outlet through which exhaust gas, which is purified while passing through the oxidation treatment unit and the adsorption treatment unit, is discharged, and an end plate which covers one side of the outlet cover; and a baffle which is disposed in front of the DOC of the oxidation treatment unit to facilitate the uniform distribution of the exhaust gas, wherein the baffle includes a perforated surface on which a plurality of perforations are formed, and the perforations formed on the perforated surface are formed at different densities, wherein the perforated surface on which the perforations are formed at different densities is divided into a high-density perforated area in which the perforations are uniformly distributed and a low-density perforated area in which the perforations are distributed at a lower density than the high-density perforated area, wherein the low-density perforated area is divided into a perforated portion, in which the perforations are formed in an arc arrangement along the edge of the perforated surface, and a non-perforated portion which is provided outside the perforated portion and has no perforations, wherein the non-perforated portion corresponds to an area defined as a bow shape, wherein the low-density perforated area is formed in a predetermined area at a position spaced a predetermined distance in parallel from cross-axis line C1 of the baffle, and wherein the non-perforated portion corresponds to an area defined as a bow shape from a point spaced $\frac{1}{2}$ of the radius of the baffle from the cross-axis line C1 to a point spaced $\frac{4}{5}$ of the radius of the baffle from the cross-axis line C1.

2. The diesel engine exhaust gas after-treatment device of claim 1, wherein the baffle is made of metal and the center of the perforated surface, on which the plurality of perforations are formed, is concavely curved at a constant curvature toward the front through which the exhaust gas is introduced.

3. The diesel engine exhaust was after-treatment device of claim 1, wherein the baffle is made of stainless steel.

4. The diesel engine exhaust gas after-treatment device of claim 2, wherein the baffle is made of stainless steel.

* * * * *